US012087484B2

(12) United States Patent
Sato et al.

(10) Patent No.: US 12,087,484 B2
(45) **Date of Patent: *Sep. 10, 2024**

(54) MULTILAYER COIL COMPONENT

(71) Applicant: TDK CORPORATION, Tokyo (JP)

(72) Inventors: Shinichi Sato, Tokyo (JP); Takahiro Sato, Tokyo (JP); Yusuke Nagai, Tokyo (JP); Mitsuharu Koike, Tokyo (JP); Kazuhiro Miura, Tokyo (JP); Seiichi Nakagawa, Tokyo (JP); Shinichi Kondo, Tokyo (JP); Takashi Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,202

(22) Filed: Jun. 6, 2023

(65) Prior Publication Data

US 2023/0317342 A1 Oct. 5, 2023

Related U.S. Application Data

(63) Continuation of application No. 16/817,046, filed on Mar. 12, 2020, now Pat. No. 11,710,593.

(30) Foreign Application Priority Data

Mar. 22, 2019 (JP) ................................ 2019-054730

(51) Int. Cl.

| | |
|---|---|
| ***H01F 27/28*** | (2006.01) |
| ***H01F 1/24*** | (2006.01) |
| ***H01F 17/00*** | (2006.01) |

(52) U.S. Cl.
CPC .......... *H01F 17/0013* (2013.01); *H01F 1/24* (2013.01); *H01F 2017/0066* (2013.01)

(58) Field of Classification Search
CPC .................. H01F 17/0013; H01F 1/24; H01F 2017/0066; H01F 1/26; H01F 27/292; H01F 27/2823; H01F 17/04
USPC ................................ 336/186, 200, 232, 192
See application file for complete search history.

(56) References Cited

U.S. PATENT DOCUMENTS

| | | | | |
|---|---|---|---|---|
| 2012/0274438 A1 | 11/2012 | Hachiya et al. | | |
| 2013/0038419 A1 | 2/2013 | Kobayashi et al. | | |
| 2014/0118100 A1* | 5/2014 | Sato .................. | H01F 17/0013 336/200 | |

(Continued)

FOREIGN PATENT DOCUMENTS

| | | | |
|---|---|---|---|
| JP | 2001-338813 A | 12/2001 | |
| JP | 2012-238840 A | 12/2012 | |

(Continued)

*Primary Examiner* — Shawki S Ismail
*Assistant Examiner* — Kazi S Hossain
(74) *Attorney, Agent, or Firm* — Oliff PLC

(57) ABSTRACT

A multilayer coil component includes an element body including a plurality of metal magnetic particles, and a plurality of coil conductors. The plurality of coil conductors is disposed in the element body. The plurality of coil conductors is separated from each other in a predetermined direction and electrically connected to each other. The plurality of coil conductors includes one pair of side surfaces opposing each other in the predetermined direction. Surface roughness of the one pair of side surfaces is less than 40% of an average particle size of the plurality of metal magnetic particles.

5 Claims, 5 Drawing Sheets

(56) References Cited

U.S. PATENT DOCUMENTS

| | | | | |
|---|---|---|---|---|
| 2015/0109088 | A1 | 4/2015 | Kim et al. | |
| 2016/0196913 | A1* | 7/2016 | Kim | H01F 17/0013 336/83 |
| 2017/0140864 | A1* | 5/2017 | Arai | H01F 1/0306 |
| 2017/0294257 | A1* | 10/2017 | Omori | H01F 17/0013 |
| 2017/0372829 | A1* | 12/2017 | Nagai | H01F 17/0033 |
| 2019/0304671 | A1* | 10/2019 | Yang | H01F 41/046 |
| 2021/0020359 | A1* | 1/2021 | Lee | H01F 27/36 |

FOREIGN PATENT DOCUMENTS

| | | | |
|---|---|---|---|
| JP | 2013-055316 | A | 3/2013 |
| JP | 2014-045081 | A | 3/2014 |
| JP | 2015-82660 | A | 4/2015 |
| WO | 2018/194100 | A1 | 10/2018 |

* cited by examiner

MULTILAYER COIL COMPONENT

This application is a Continuation of application Ser. No. 16/817,046, Mar. 12, 2020, which claims priority to Japanese Application No. 2019-054730, filed Mar. 22, 2019. The entire contents of the prior applications are hereby incorporated by reference herein in their entirety.

BACKGROUND OF THE INVENTION

1. Field of the Invention

The present invention relates to a multilayer coil component.

2. Description of Related Art

Known multilayer coil components include an element body including a plurality of metal magnetic particles and a plurality of coil conductors (see, for example, Japanese Unexamined Patent Publication No. 2013-055316). The plurality of coil conductors is disposed in the element body, the plurality of coil conductors being separated from each other in a predetermined direction and electrically connected to each other.

SUMMARY OF THE INVENTION

An object of one aspect of the present invention is to provide a multilayer coil component that controls a decrease in Q characteristics in a high-frequency range.

A multilayer coil component according to one aspect of the present invention includes an element body including a plurality of metal magnetic particles, a plurality of coil conductors disposed in the element body, the plurality of coil conductors being separated from each other in a predetermined direction and electrically connected to each other. The plurality of coil conductors includes one pair of side surfaces opposing each other in the predetermined direction. Surface roughness of the one pair of side surfaces is less than 40% of an average particle size of the plurality of metal magnetic particles.

Q characteristics of the multilayer coil component depend on a resistance of the coil conductors. In a high-frequency range, a current (signal) tends to flow near surfaces of the coil conductors due to the skin effect. Therefore, as the resistance at and near the surfaces of the coil conductors increases, the Q characteristics of the multilayer coil component decreases. Hereinafter, the resistance component at and near the surfaces of the coil conductors is referred to as "surface resistance". A configuration in which the surfaces of the coil conductors have irregularities substantially increases a length of current flow, and thus increases the surface resistance, as compared with a configuration in which the surfaces of the coil conductors have no irregularities.

A configuration in which the surface roughness of the pair of side surfaces opposing each other in the predetermined direction is less than 40% of the average particle size of the plurality of metal magnetic particles controls an increase in surface resistance and controls a decrease in Q characteristics in a high-frequency range, as compared with a configuration in which the surface roughness of the pair of side surfaces is equal to or larger than 40% of the average particle size of the plurality of metal magnetic particles. Therefore, the one aspect controls the increase in the surface resistance and controls the decrease in the Q characteristics in the high-frequency range.

In the one aspect, the plurality of coil conductors may include another pair of side surfaces extending to couple the one pair of side surfaces. Surface roughness of the other pair of side surfaces may be smaller than the surface roughness of the one pair of side surfaces. This configuration has low surface resistance, as compared with a configuration in which the surface roughness of the other pair of side surfaces is equal to or greater than the surface roughness of the one pair of side surfaces. Therefore, this configuration further controls the increase in the surface resistance and further controls the decrease in the Q characteristics in the high-frequency range.

In the one aspect, the plurality of coil conductors may be plating conductors.

In a case in which the coil conductors are sintered metal conductors, the coil conductors are each formed by sintering a metal component (metal powder) contained in a conductive paste. In this case, the metal magnetic particles bite into the conductive paste before the metal component is sintered. Irregularities due to the shape of the metal magnetic particles are formed on a surface of the conductive paste. The formed coil conductors are deformed so that the metal magnetic particles bite into the coil conductors. Therefore, a configuration in which the coil conductors are the sintered metal conductors significantly increases the surface roughness of the coil conductors.

In a case in which the coil conductors are the plating conductors, the metal magnetic particles tend not to bite into the coil conductors. In this case, deformation of the coil conductors is reduced. Therefore, the configuration in which the coil conductors are the plating conductors controls an increase in the surface roughness of the coil conductors and controls an increase in the surface resistance.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
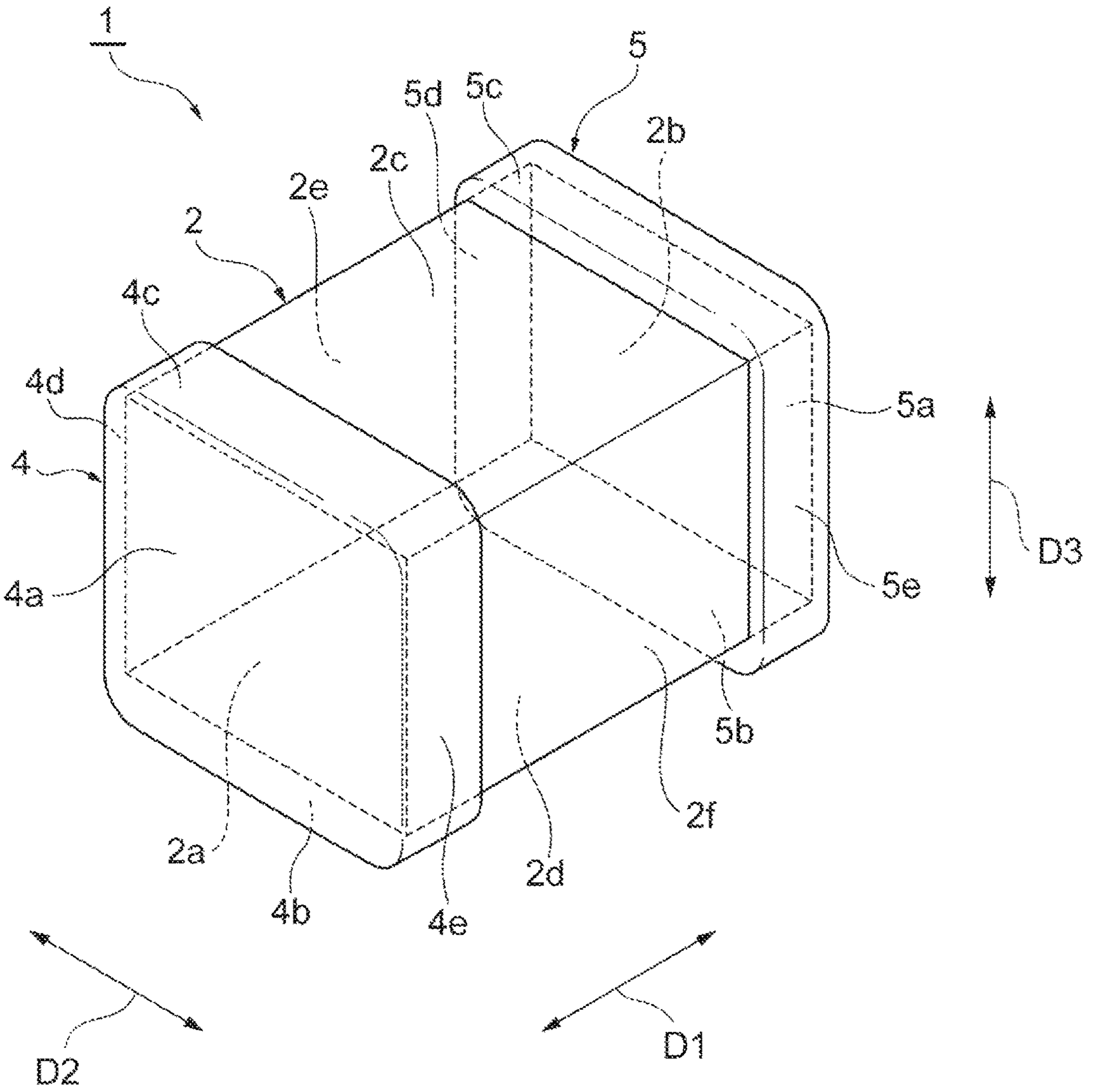
FIG. 1 is a perspective view illustrating a multilayer coil component according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
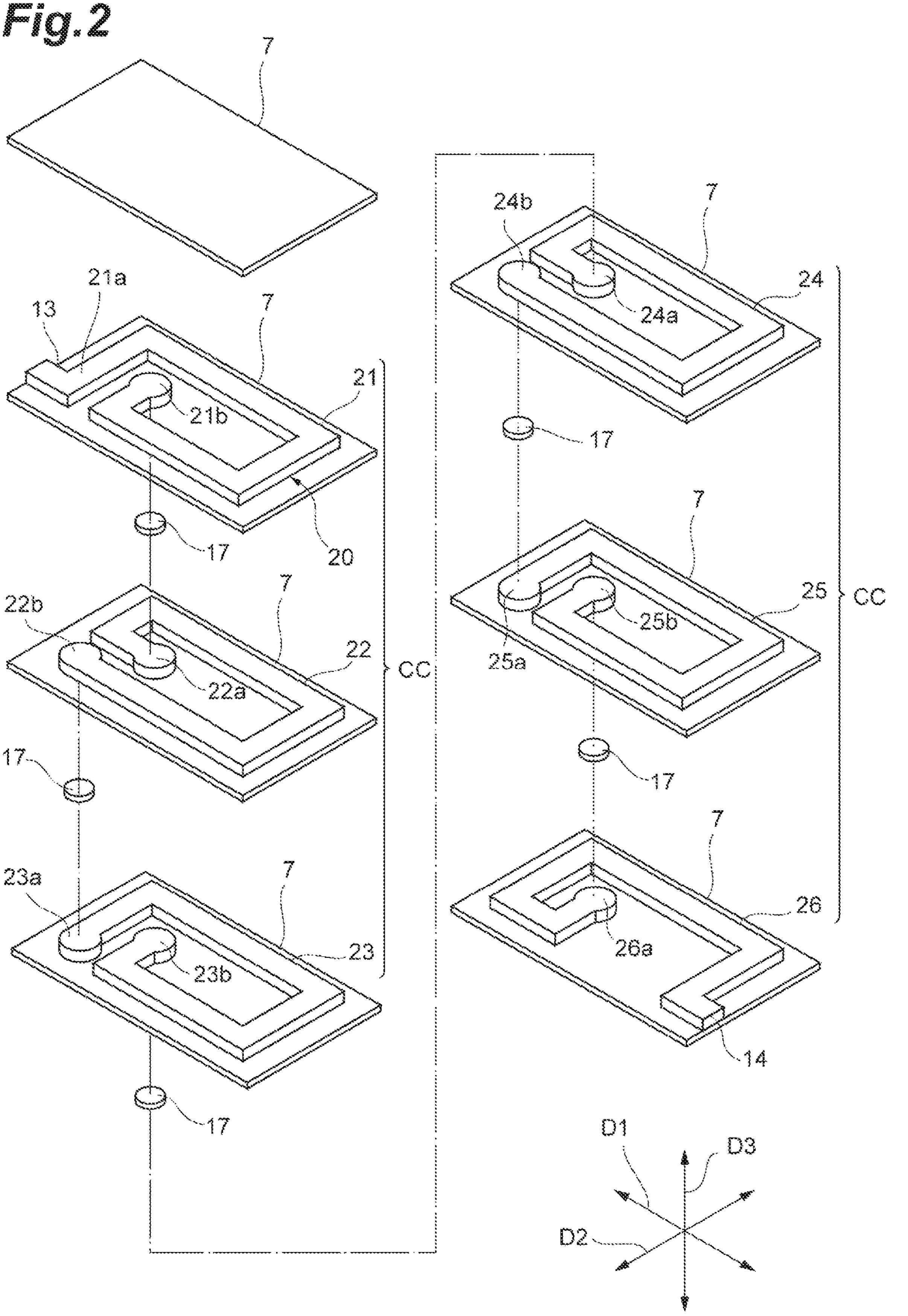
FIG. 2 is an exploded perspective view of the multilayer coil component according to the embodiment.
Figure 3:
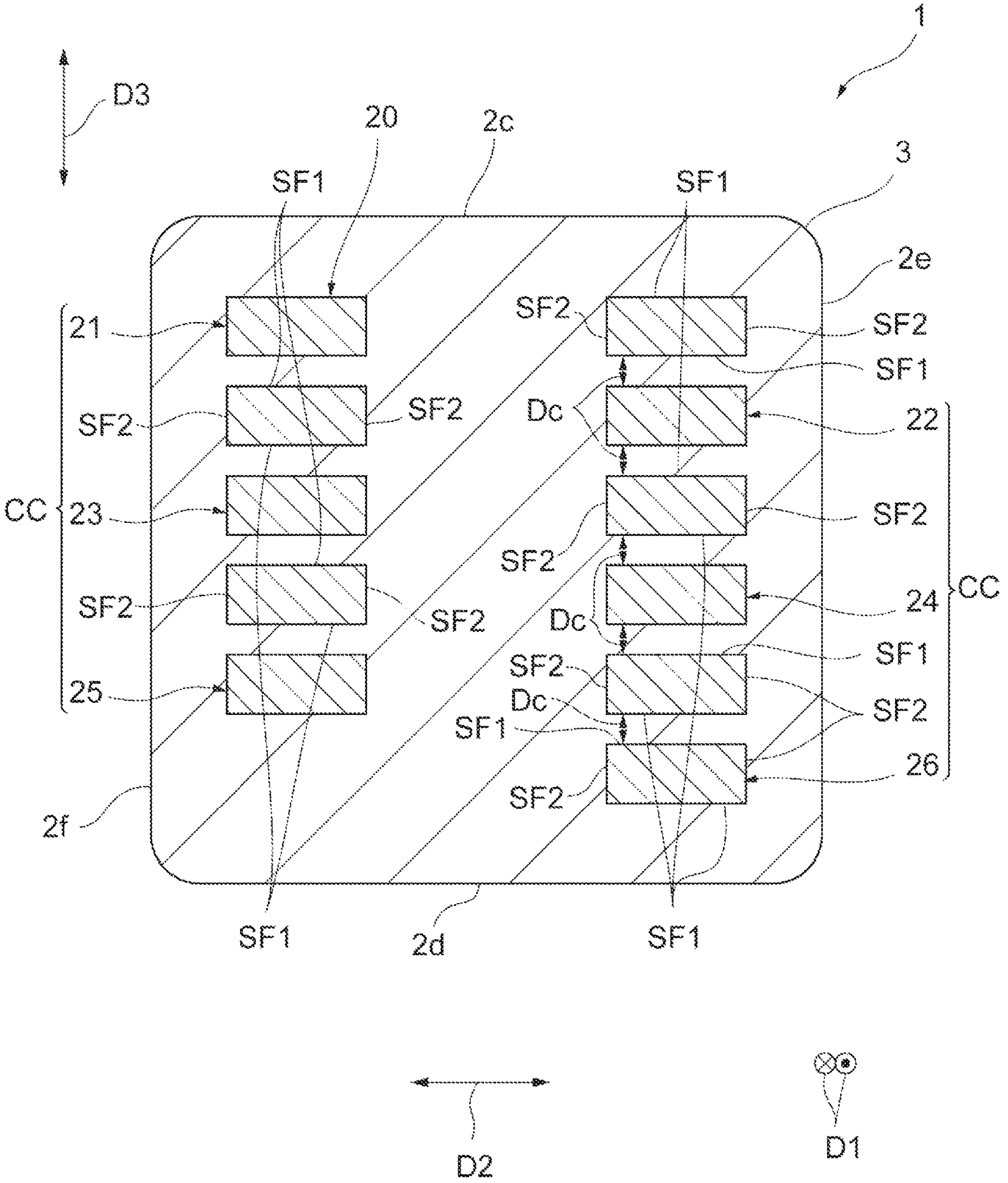
FIG. 3 is a schematic diagram illustrating a cross-sectional configuration of the multilayer coil component according to the embodiment.

A configuration of a multilayer coil component 1 according to an embodiment will be described with reference to FIGS. 1 to 3. FIG. 1 is a perspective view illustrating the multilayer coil component according to the embodiment. FIG. 2 is an exploded perspective view of the multilayer coil component according to the embodiment. FIG. 3 is a schematic diagram illustrating a cross-sectional configuration of the multilayer coil component according to the embodiment.

As illustrated in FIGS. 1 to 3, the multilayer coil component 1 includes an element body 2 and a pair of external electrodes 4, 5. The pair of external electrodes 4, 5 is disposed at both ends of the element body 2. The multilayer coil component 1 is applicable to, for example, a bead inductor or a power inductor.

The element body 2 has a rectangular parallelepiped shape. The rectangular parallelepiped shape includes a rectangular parallelepiped shape in which corners and ridges are chamfered, and a rectangular parallelepiped shape in which the corners and ridges are rounded. The element body 2 includes a pair of end surfaces 2*a*, 2*b* opposing each other and includes four side surfaces 2*c*, 2*d*, 2*e*, 2*f*. The four side surfaces 2*c*, 2*d*, 2*e*, 2*f* extend in a direction in which the pair of end surfaces 2*a*, 2*b* opposes each other to connect to the pair of end surfaces 2*a*, 2*b*.

The end surfaces 2*a* and the end surface 2*b* oppose each other in a first direction D1. The side surface 2*c* and the side surface 2*d* oppose each other in a second direction D2. The side surface 2*e* and the side surface 2*f* oppose each other in a third direction D3. The first direction D1, the second direction D2, and the third direction D3 are approximately orthogonal to each other. The side surface 2*d* includes a surface that opposes an electronic device (not illustrated) when the multilayer coil component 1 is mounted on the electronic device, for example. Examples of the electronic device include a circuit board and an electronic component. In the present embodiment, the side surface 2*d* is arranged to constitute a mounting surface. The side surface 2*d* includes the mounting surface.

The element body 2 is configured by laminating a plurality of magnetic layers 7. The magnetic layers 7 are laminated in the third direction D3. The element body 2 includes the plurality of laminated magnetic layers 7. In an actual element body 2, the plurality of magnetic layers 7 is integrated in such a way that boundaries between the magnetic layers cannot be visually recognized.

Each of the magnetic layers 7 includes a plurality of metal magnetic particles. The metal magnetic particles are made of, for example, a soft magnetic alloy. The soft magnetic alloy is, for example, an Fe—Si alloy. In a case in which the soft magnetic alloy is an Fe—Si alloy, the soft magnetic alloy may contain P. The soft magnetic alloy may be, for example, an Fe—Ni—Si-M alloy. "M" includes at least one element selected from Co, Cr, Mn, P, Ti, Zr, Hf, Nb, Ta, Mo, Mg, Ca, Sr, Ba, Zn, B, Al, and rare earth elements. In the magnetic layers 7, the metal magnetic particles are bonded to each other. The metal magnetic particles are bonded to each other through, for example, bonding of oxide films formed on surfaces of the metal magnetic particles. The element body 2 includes resin. The resin exists between the plurality of metal magnetic particles. The resin is a resin having an electrical insulation, that is, insulating resin. Examples of the insulating resin include a silicone resin, a phenol resin, an acrylic resin, and an epoxy resin.

An average particle size of the metal magnetic particles is in a range of from 0.5 μm to 15 μm. In the present embodiment, the average particle size of the metal magnetic particles is 5 μm. In the present embodiment, the "average particle size" corresponds to a particle size at an integrated value of 50% in a particle size distribution obtained by a laser diffraction/scattering method.

The external electrode 4 is disposed on the end surface 2*a* of the element body 2, and the external electrode 5 is disposed on the end surface 2*b* of the element body 2. The external electrode 4 and the external electrode 5 are separated from each other in the first direction D1. The external electrodes 4, 5 have an approximately rectangular shape in plan view, and corners of the external electrodes 4, 5 are rounded. The external electrodes 4, 5 include an electrically-conductive material. The electrically-conductive material is, for example, Ag or Pd. The external electrodes 4, 5 are each configured as a sintered body of a conductive paste. The conductive paste contains a conductive metal powder and glass frit. The conductive metal powder is, for example, an Ag powder or a Pd powder. On surfaces of the external electrodes 4, 5, plating layers are formed. The plating layers are formed by, for example, electroplating. The electroplating is, for example, Ni electroplating or Sn electroplating.

The external electrode 4 includes five electrode portions. The external electrode 4 includes an electrode portion 4*a* located on the end surface 2*a*, an electrode portion 4*b* located on the side surface 2*d*, an electrode portion 4*c* located on the side surface 2*c*, an electrode portion 4*d* located on the side surface 2*e*, and an electrode portion 4*e* located on the side surface 2*f*. The electrode portion 4*a* covers a whole of the end surface 2*a*. The electrode portion 4*b* covers a part of the side surface 2*d*. The electrode portion 4*c* covers a part of the side surface 2*c*. The electrode portion 4*d* covers a part of the side surface 2*e*. The electrode portion 4*e* covers a part of the side surface 2*f*. The five electrode portions 4*a*, 4*b*, 4*c*, 4*d*, 4*e* are formed integrally.

The external electrode 5 includes five electrode portions. The external electrode 5 includes an electrode portion 5*a* located on the end surface 2*b*, an electrode portion 5*b* located on the side surface 2*d*, an electrode portion 5*c* located on the side surface 2*c*, an electrode portion 5*d* located on the side surface 2*e*, and an electrode portion 5*e* located on the side surface 2*f*. The electrode portion 5*a* covers a whole of the end surface 2*b*. The electrode portion 5*b* covers a part of the side surface 2*d*. The electrode portion 5*c* covers a part of the side surface 2*c*. The electrode portion 5*d* covers a part of the side surface 2*e*. The electrode portion 5*e* covers a part of the side surface 2*f*. The five electrode portions 5*a*, 5*b*, 5*c*, 5*d*, 5*e* are integrally formed.

The multilayer coil component 1 includes a coil 20 and a pair of connection conductors 13, 14. The coil 20 is disposed in the element body 2. The coil 20 includes a plurality of coil conductors CC. In the present embodiment, the plurality of coil conductors CC includes six coil conductors 21 to 26. The coil 20 includes a through-hole conductor 17. The pair of connection conductors 13, 14 is also disposed in the element body 2.

The coil conductors CC (coil conductors 21 to 26) are disposed in the element body 2. The coil conductors 21 to 26 are separated from each other in the third direction D3. Distances Dc between the coil conductors 21 to 26 adjacent to each other in the third direction D3 are equivalent to each other. The distances Dc may be different from each other. A coil axis of the coil 20 extends along the third direction D3.

A thickness of the coil conductors 21 to 26 is, for example, about 40 μm. A width of the coil conductors 21 to 26 is, for example, about 150 μm.

The distances Dc are, for example, in a range of from 5 μm to 30 μm. In the present embodiment, the distances Dc are 15 μm. A surface of each of the coil conductors 21 to 26 has roughness as described later, and thus, the distances Dc vary in response to a surface shape of each of the coil conductors 21 to 26. Therefore, the distances Dc are obtained, for example, as follows.

A cross-sectional photograph of the multilayer coil component 1 including each of the coil conductors CC (each of the coil conductors 21 to 26) is acquired. The cross-sectional photograph is obtained, for example, by capturing a cross-section of the multilayer coil component 1 when cut along a plane that is parallel to the pair of end surfaces 2*a*, 2*b* and is separated from the end surface 2*a* by a predetermined distance. The plane may be located equidistant from the pair of end surfaces 2*a*, 2*b*. The cross-sectional photograph may be obtained by capturing a cross-section of the multilayer coil component 1 when cut along a plane that is parallel to the pair of side surfaces 2*e*, 2*f* and is separated from the side surface 2*e* by a predetermined distance.

A distance between the coil conductors CC adjacent to each other in the third direction D3 on the acquired cross-sectional photograph is measured at a plurality of given positions. The number of measurement positions is, for example, "50". An average of the measured distances is calculated. The calculated average value is the distance Dc.

One end and another end of each of the coil conductors 21, 23, 25, 26 are separated from each other in the third direction D3. One end and another end of each of the coil conductors 22, 24 are separated from each other in the second direction D2. Each of the coil conductors 21 to 26 adjacent to each other in the third direction D3 includes a first conductor portion and a second conductor portion. The first conductor portions overlap each other when viewed from the third direction D3. The second conductor portions do not overlap each other when viewed from the third direction D3.

The through-hole conductor 17 is located between ends of the coil conductors 21 to 26 adjacent to each other in the third direction D3. The through-hole conductor 17 connects the ends of the coil conductors 21 to 26 adjacent to each other in the third direction D3. The plurality of coil conductors 21 to 26 is electrically connected to each other through the through-hole conductor 17. An end of the coil conductor 21 constitutes one end of the coil 20. An end of the coil conductor 26 constitutes another end of the coil 20. An axis direction of the coil 20 extends along the third direction D3.

The connection conductor 13 is connected to the coil conductor 21. The connection conductor 13 is contiguous with the coil conductor 21. The connection conductor 13 is formed integrally with the coil conductor 21. The connection conductor 13 couples an end 21*a* of the coil conductor 21 and the external electrode 4 and is exposed at the end surface 2*a* of the element body 2. The connection conductor 13 is connected to the electrode portion 4*a* of the external electrode 4. The connection conductor 13 electrically connects the one end of the coil 20 and the external electrode 4.

The connection conductor 14 is connected to the coil conductor 26. The connection conductor 14 is contiguous with the coil conductor 26. The connection conductor 14 is formed integrally with the coil conductor 26. The connection conductor 14 couples an end 26*b* of the coil conductor 26 and the external electrode 5 and is exposed at the end surface 2*b* of the element body 2. The connection conductor 14 is connected to the electrode portion 5*a* of the external electrode 5. The connection conductor 14 electrically connects the other end of the coil 20 and the external electrode 5.

The coil conductors CC (coil conductors 21 to 26) and the connection conductors 13, 14 are plating conductors. The coil conductors CC and the connection conductors 13, 14 include an electrically-conductive material. The electrically-conductive material is, for example, Ag, Pd, Cu, Al, or Ni. The through-hole conductor 17 includes an electrically-conductive material. The an electrically-conductive material is, for example, Ag, Pd, Cu, Al, or Ni. The through-hole conductor 17 is constituted as a sintered body of a conductive paste. The conductive paste contains a conductive metal powder. The conductive metal powder is, for example, an Ag powder, a Pd powder, a Cu powder, an Al powder, or an Ni powder. The through-hole conductor 17 may be a plating conductor.

Figure 4:
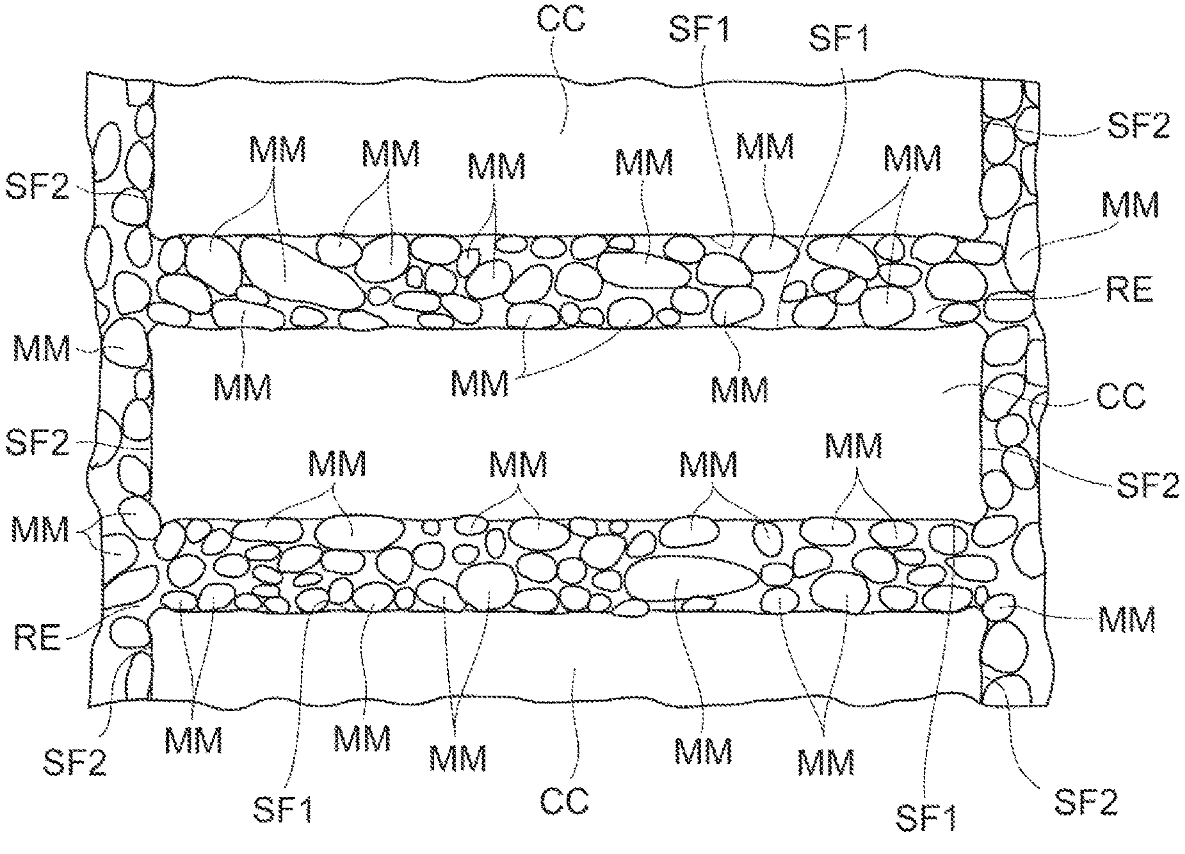
FIG. 4 is a view illustrating a cross-sectional configuration of a coil conductor.

Each of the coil conductors CC (each of the coil conductors 21 to 26) includes a pair of side surfaces SF1, as illustrated in FIGS. 3 and 4. The pair of side surfaces SF1 is opposes each other in the third direction D3. Each of the coil conductors CC includes a pair of side surfaces SF2 different from the pair of side surfaces SF1. The pair of side surfaces SF2 extends to couple the pair of side surfaces SF1. Each of the coil conductors CC has an approximately square shape in cross-section. Each of the coil conductors CC has, for example, an approximately rectangular or trapezoidal shape in cross-section. FIG. 4 is a schematic diagram illustrating a cross-sectional configuration of the coil conductor. In FIG. 4, hatching representing the cross-section is omitted.

Surface roughness of each of the side surfaces SF1 is less than 40% of an average particle size of metal magnetic particles MM. In the present embodiment, the surface roughness of each of the side surfaces SF1 is less than 2 μm. The surface roughness of each of the side surfaces SF1 is, for example, in a range of from 1.0 μm to 1.8 μm. In this case, the surface roughness of each of the side surfaces SF1 is in a range of from 20% to 36% of the average particle size of the metal magnetic particles MM. The surface roughness of each of the side surfaces SF1 may be approximately 0 μm. As illustrating in FIG. 4, resin RE exists between the metal magnetic particles MM. As described above, examples of the resin RE include a silicone resin, a phenol resin, an acrylic resin, and an epoxy resin.

The surface roughness of each of the side surfaces SF1 of the coil conductors CC is obtained, for example, as follows.

A cross-sectional photograph of the multilayer coil component 1 including each of the coil conductors CC (each of the coil conductors 21 to 26) is acquired. As described above, the cross-sectional photograph is obtained, for example, by capturing the cross-section of the multilayer coil component 1 when cut along the plane that is parallel to the pair of end surfaces 2*a*, 2*b* and is separated from the end surface 2*a* by the predetermined distance. In this case, the plane may be located equidistant from the pair of end surfaces 2*a*, 2*b*. As described above, the cross-sectional photograph may be obtained by capturing the cross-section of the multilayer coil component 1 when cut along the plane that is parallel to the pair of side surfaces 2*e*, 2*f* and that is separated from the side surface 2*e* by the predetermined distance.

A curve corresponding to each of the side surfaces SF1 on the acquired cross-sectional photograph is represented by a roughness profile. A portion of the side surface SF1 (roughness profile) on the cross-sectional photograph is sampled only by a sampling length, and a peak line at the highest peak in the sampled portion is obtained. The sampling length is, for example, 100 μm. The peak line is orthogonal to the third direction D3 and serves as a reference line. The sampled portion is equally divided into a predetermined number of sections. The predetermined number is, for example, "10". A valley line at the lowest bottom is obtained for each of the equally divided sections. The valley line is also orthogonal to the third direction D3. A distance between the peak line and the valley line in the third direction D3 is measured for each of the equally divided sections. An average of the measured distances is calculated. The calculated average is the surface roughness. The surface roughness is obtained for each of the side surfaces SF1 by the above-described procedure.

A plurality of cross-sectional photographs is acquired at different positions, and the surface roughness may be obtained for each of the cross-sectional photographs. In this case, the average value of the plurality of degrees of obtained surface roughness may be the surface roughness.

Q characteristics of the multilayer coil component 1 depend on a resistance of the coil conductors CC (coil conductors 21 to 26). In a high-frequency range, a current (signal) tends to flow near the surfaces of the coil conductors CC due to the skin effect. Therefore, as the surface resistance of the coil conductors CC increases, the Q characteristics of the multilayer coil component 1 decreases. A configuration in which the surfaces of the coil conductors CC have irregularities substantially increases a length of current flow, and thus increases the surface resistance, as compared with a configuration in which the surfaces of the coil conductors CC have no irregularities.

A configuration in which the surface roughness of each of the side surfaces SF1 is less than 40% of the average particle size of the metal magnetic particles MM controls an increase in surface resistance and controls a decrease in Q characteristics in a high-frequency range, as compared with a configuration in which the surface roughness of each of the side surfaces SF1 is equal to or greater than 40% of the average particle size of the metal magnetic particles MM. Therefore, the multilayer coil component 1 controls the increase in the surface resistance and controls the decrease in the Q characteristics in the high-frequency range.

In the multilayer coil component 1, the surface roughness of the pair of side surfaces SF2 is smaller than the surface roughness of the pair of side surfaces SF1. The multilayer coil component 1 has low surface resistance of the coil conductors CC (coil conductors 21 to 26), as compared with a configuration in which the surface roughness of the pair of side surfaces SF2 is equal to or greater than the surface roughness of the pair of side surfaces SF1. Therefore, the multilayer coil component 1 further controls the increase in the surface resistance and further controls the decrease in the Q characteristics in the high-frequency range.

In the multilayer coil component 1, the coil conductors CC (coil conductors 21 to 26) are plating conductors.

Figure 5:
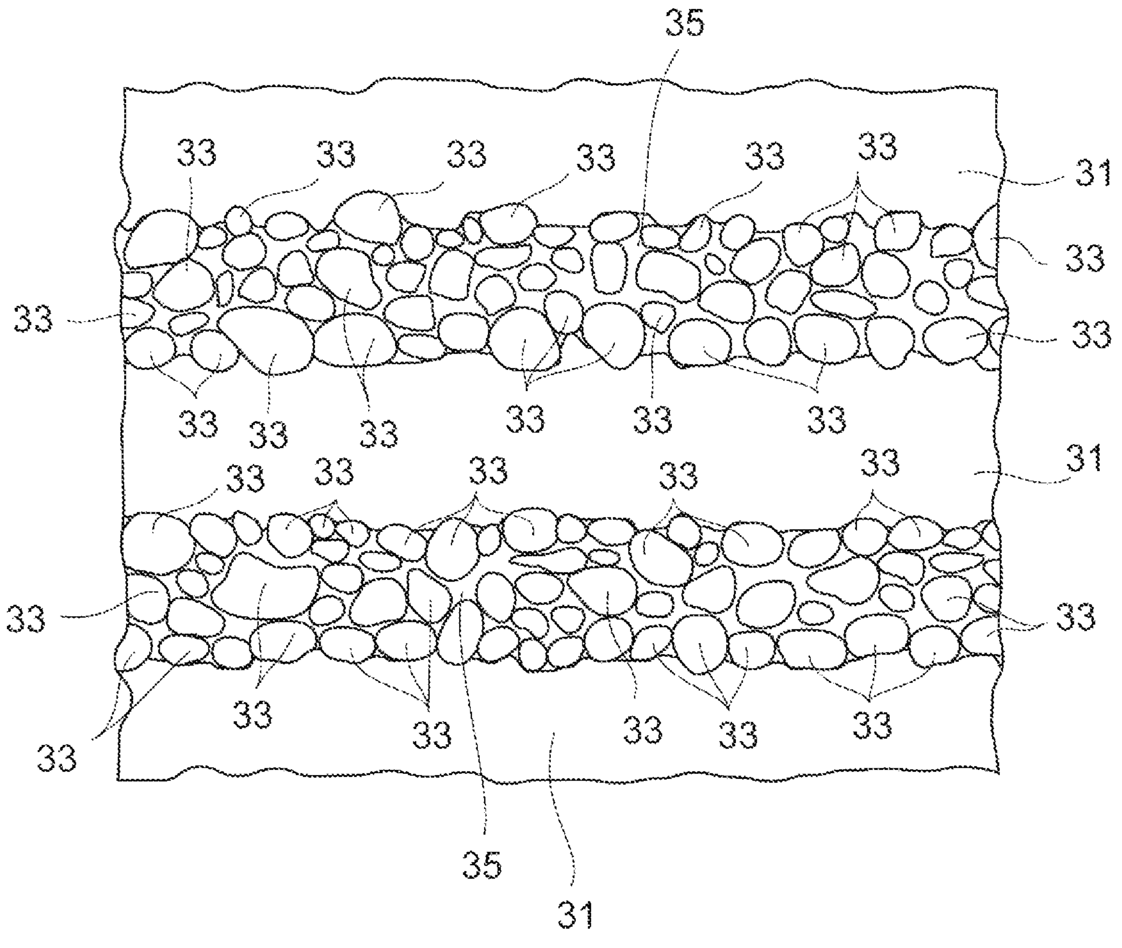
FIG. 5 is a view illustrating a cross-sectional configuration of a coil conductor in a case in which the coil conductor is a sintered metal conductor.

In a case in which the coil conductors are sintered metal conductors, the coil conductors are each formed by sintering a metal component (metal powder) contained in the conductive paste. In this case, the metal magnetic particles bite into the conductive paste before the metal component is sintered. Irregularities due to the shape of the metal magnetic particles are formed on a surface of the conductive paste. As illustrated in FIG. 5, in a case in which a coil conductor 31 is a sintered metal conductor, the coil conductor 31 is deformed so that the metal magnetic particles 33 bite into the coil conductor 31. Therefore, the configuration in which the coil conductor 31 is the sintered metal conductor significantly increases surface roughness of the coil conductor 31. Resin 35 exists between the metal magnetic particles 33. FIG. 5 is a schematic diagram illustrating a cross-sectional configuration of the coil conductor in a case in which the coil conductor is the sintered metal conductor. In FIG. 5, hatching representing the cross-section is omitted.

In a case in which the coil conductors CC are the plating conductors, as illustrated in FIG. 4, the metal magnetic particles MM tend not to bite into the coil conductors CC, and deformation of the coil conductor CC is reduced. Therefore, the configuration in which the coil conductors CC are the plating conductors controls an increase in the surface roughness of the coil conductors CC and controls an increase in the surface resistance.

Although the embodiments and modifications of the present invention have been described above, the present invention is not necessarily limited to the embodiments and modifications, and the embodiment can be variously changed without departing from the scope of the invention.

The number of coil conductors CC (coil conductors 21 to 26) is not limited to the above-descried number.

The coil axis of the coil 20 may extend along the first direction D1. In this case, the magnetic layers 7 are laminated in the first direction D1, and the coil conductors CC (coil conductors 21 to 26) are separated from each other in the first direction D1.

The external electrode 4 may include only one of the electrode portions 4*a*, 4*b*. The external electrode 5 may also include only one of the electrode portions 5*a*, 5*b*.

What is claimed is:

1. A multilayer coil component comprising:
- an element body including a plurality of metal magnetic particles; and
- a plurality of coil conductors in the element body, the plurality of coil conductors being separated from each other in a predetermined direction and electrically connected to each other,
- wherein the plurality of coil conductors each includes a plating conductor, and
- at least one of the plurality of coil conductors includes a surface having a portion that is formed with a dent corresponding to a shape of a metal magnetic particle in a vicinity of the portion.

2. The multilayer coil component according to claim 1, wherein the plating conductor includes Ag.

3. The multilayer coil component according to claim 1, further comprising:
- a through-hole conductor connecting a pair of coil conductors adjacent each other, of the plurality of coil conductors, and including a plating conductor.

4. A multilayer coil component comprising:
- an element body including a plurality of metal magnetic particles;
- a plurality of coil conductors in the element body, the plurality of coil conductors being separated from each other in a predetermined direction and electrically connected to each other; and
- a through-hole conductor connecting a pair of coil conductors adjacent each other, of the plurality of coil conductors,
- wherein the plurality of coil conductors and the through-hole conductor each includes a plating conductor, and
- the coil conductor includes a surface that is formed with a dent corresponding to a shape of the metal magnetic particle.

5. The multilayer coil component according to claim 4, wherein the plating conductor includes Ag.

* * * * *